(12) United States Patent
Nagel et al.

(10) Patent No.: US 6,725,454 B1
(45) Date of Patent: Apr. 20, 2004

(54) METHOD AND APPARATUS FOR CAPACITY CONSUMPTION PROFILING IN A CLIENT/SERVER ENVIRONMENT

(75) Inventors: Lynn Nowers Nagel, Houston, TX (US); John Augustin Oustalet, III, Allen, TX (US); Ralf H. Schmidt-Dannert, Shoreview, MN (US); Reginald James Dilley, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/643,075

(22) Filed: Aug. 21, 2000

(51) Int. Cl.⁷ .................................................. G06F 9/00
(52) U.S. Cl. ...................... 718/100; 718/104; 709/220; 709/226; 717/130
(58) Field of Search ................ 709/100, 101, 709/102, 103, 104, 105, 220, 221, 222, 223, 203, 226; 718/100, 101, 102, 103, 104; 717/127, 128, 130

(56) References Cited

U.S. PATENT DOCUMENTS

| | | | |
|---|---|---|---|
| 5,355,487 A | * 10/1994 | Keller et al. | 717/127 |
| 5,483,468 A | * 1/1996 | Chen et al. | 702/186 |
| 5,961,598 A | 10/1999 | Sime | 709/224 |
| 6,018,619 A | 1/2000 | Allard et al. | 395/200.54 |
| 6,086,618 A | * 7/2000 | Al-Hilali et al. | 703/2 |
| 6,223,205 B1 | * 4/2001 | Harchol-Balter et al. | 709/105 |
| 6,370,560 B1 | * 4/2002 | Robertazzi et al. | 709/105 |

FOREIGN PATENT DOCUMENTS

WO    WO 99/46712    9/1999    ............ G06F/17/60

* cited by examiner

Primary Examiner—Majid A. Banankhah
(74) Attorney, Agent, or Firm—Michael F. Hoffman; Hoffman, Warnick & D'Alessandro

(57) ABSTRACT

A system and method for identifying capacity consumption profiles in a client/server computer system, which include such applications as enterprise resource planning customer relationship planning and supply change management. These profiles may be used for improving the ability to forecast those computer requirements necessary to accommodate a user's future data processing requirements. Additionally, these profiles allow for the categorizing of different types of computer usage for a specific client/server solution in a particular industry, which can provide sizing guidance to new users of these client/server solutions. In the present method, selected available statistics and accounting information are consolidated by a context aware process followed by statistical data analysis. After the desired types of profiles are selected with their available client/server identification, the context of the work effort that is being measured is tracked. This allows otherwise undefined activities to be identified in terms of the other associated activities being performed, and then allocated to the correct consumption profile. This is followed by statistical analysis and reduction of the intermediate by a context sensitive reduction process.

4 Claims, 2 Drawing Sheets

METHOD AND APPARATUS FOR CAPACITY CONSUMPTION PROFILING IN A CLIENT/SERVER ENVIRONMENT

BACKGROUND OF THE INVENTION

The present invention relates to a method and system for creating capacity consumption profiles in a client/server system in order to more accurately predict the system capacity requirement for selected software applications.

Recently, there has been a proliferation of enterprise resource planning (ERP), customer relationship management (CRM) and supply chain management (SCM) solutions including hardware and software. After installation, users frequently find that their computer equipment is insufficient to meet their data processing need when running these software solutions. One problem is that the software products that provide these business solutions do not create or capture the required metrics to enable capacity consumption profiling. Therefore, very little definitive information exists to forecast computer system requirements.

To address this lack of quality metrics for these computer solutions, many software developers have created products to assist in the management of these network based computer solutions. Currently available software products still are not minimally invasive, they cannot determine whether data is missing through usage pattern context, and they do not have the means to statistically validate and correct data that may be incorrect, missing, or highly variable.

A context aware process is one that is aware of the activities that are taking place and makes decisions based on that knowledge. It is common in this environment for some of the data elements to be unavailable. This causes known software management products to report up to 40% of the system activity as "unknown." Various system management products attempt to solve this problem by including software to create the required data. However, these solutions typically are not successful because the developer cannot know or predict the purpose of additional features or code added by the end user. Further, there are many support functions in large client/server solutions which perform different functions depending on how they are invoked.

Statistical validation and correction of data as a process is self-defining. Many software management products perform statistical analysis by using statistical processes to identify problems, variations, trends, and patterns. However, current software management products do not use statistical analysis to correct incorrectly reported or missing data. To correct or add data through statistical analysis requires the use of several associated data elements in determining the missing or incorrect data elements. These analysis techniques vary depending on the types of data elements available compared to those being derived and the fundamental underlying patterns and relationships between and among the various data elements.

One know method of system analysis and management is described in U.S. Pat. No. 5,961,598 to Sime, entitled "System and Method for Internet Gateway Performance Charting," which provides a method for capturing and reporting usage statistics of network gateways, for example, the connection between a corporate intranet and the public internet. The disclosed method does not attempt to profile the collected data, identify context, create usage profiles, or recover any missing or erroneous data.

U.S. Pat. No. 6,018,619 to Allard et al., entitled "Method, System and Apparatus for Client-Side Usage Tracking of Information Server Systems," discloses a method of transporting the statistics, referred to in the patent as stoical data, that are accumulated during a network connection while minimizing the loss of that data. As in the '598 referenced above, the disclosed system and method does not profile the patterns of consumption of the data and does not include context awareness or additional statistical analysis for consumption profiling.

PCT Application No. WO 99/46712 of Goldband et al., entitled "Interactivfe Customer Support for Computer Programs Using Network Connection of User Machine," discloses a system which monitors and collects computer usage data for the purpose of providing interactive software support by means of a software agent installed in a user's machine. The context awareness for the disclosed system does not include means for resolving an unknown state unlike the one currently being submitted by the agent.

There is thus a need for a software analysis and management system and method which is minimally invasive to the system being managed, resolves missing activity information and validates and corrects the analysis data.

SUMMARY OF THE INVENTION

The present invention addresses the above-mentioned problems by providing a system and method for identifying capacity consumption profiles in a client/server computer system. The profiles may be used for improving the ability to forecast those computer requirements necessary to accommodate a user's future data processing requirements. In the method according to the present invention, selected available statistics and accounting information are consolidated by a context aware process followed by statistical data analysis. Context awareness is employed to associate activities on a computer system with profiles, which are then correlated with resource consumption data to create a defined pattern of computer resource consumption associatede therewith. This is followed by statistical analysis and reduction of the intermediate by a context sensitive reduction process.

In one embodiment, two sets of profiles are defined. One set of profiles categorizes business functions such as financial, materials managements, sales and distribution. The second set of profiles defines activities in terms of reports, user written programs, vendor supplied software and batch processes, as contrasted with interactive online activities supporting a user at a terminal. Each of these sets of profiles are populated with observed activities and reported consumption. This data is then analyzed using a least squares fit in order to correlate it with actual consumption. The standard deviation from this fit is then used to identify errant points. Finally, consumption is attributed to profiles for which no reported consumption exists, only consumption estimated by a similar least squares analysis against reported activities. Consumption metrics by profile may be provided in graphical or other selected format.

It is therefore an object of the present invention to provide a system and method for profiling the computational activity patterns and usage of computer systems.

It is also an object of this invention to provide a profiling system and method capable of handling and correlate input data from several sources, thereby providing otherwise unavailable resource capacity usage data.

It is another object of this invention to attribute computer activities with an applicable profile when the information normally required for that activity identification is missing.

It is yet a further object of this invention to identify errant resource usage data points acquired from available sources ant to exclude or correct such errant data points.

Still another object of this invention to provide a minimally invasive resource consumption profiling method and system, thereby reducing the impact of capturing available data and the potential contamination of the results.

BRIEF DESCRIPTION OF THE DRAWINGS

Preferred embodiments of the present invention will hereinafter be described by reference to the appended drawings, in which like designations denote like elements and wherein.

DETAILED DESCRIPTION OF THE DRAWINGS

The following terms as used herein have the following meanings, as will be understood by those skilled in the art. A "client/server" is at least two computers communicating over a network to produce a desired result. A "profile" is a set of rules that defines both what and how selected activities are to be identified, grouped and/or summarized. "Context awareness" is the ability to recognize activities in terms of the rules that define various profiles and keep track of that analysis in order to associate those activities for which the defined rules do not identify a profile. An "activity" is any action that consumes computer resources. An "entity" is anything that generates activities. This generally includes users of the system as well as other elements that submit work to be executed, for example, a batch scheduler. A "solution" is the set of software that provides a desired functionality. This functionality is frequently the support of a group of related business tasks. "Reported" refers to observations. These are typically best-case estimates of consumption or activities that are not being directly measured by the responsible system that manages them. Application software may try to report how much CPU capacity it consumed, but it is not responsible for maintaining this information, rather, the operating system is. "Actual" represents real elements. Simply stated, these are the recorded data elements for which the recording system is responsible for supporting. For example, the operating system is responsible for the distribution of CPU resources among the various applications that are executing and therefore provides actual CPU consumption and utilization.

Figure 1:
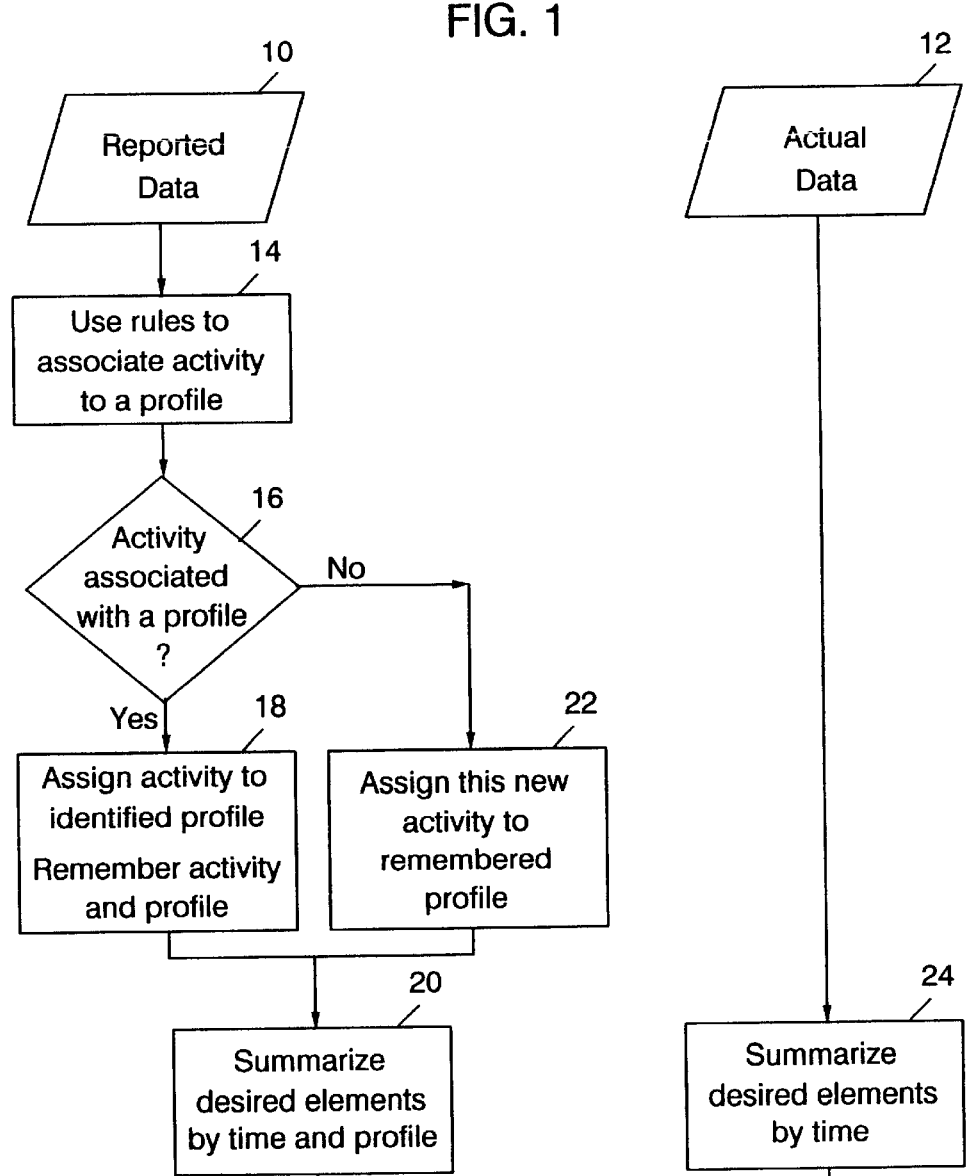
FIG. 1 is a flow chart depicting the capacity consumption profiling method according to one embodiment of the present invention.
Figure 2:
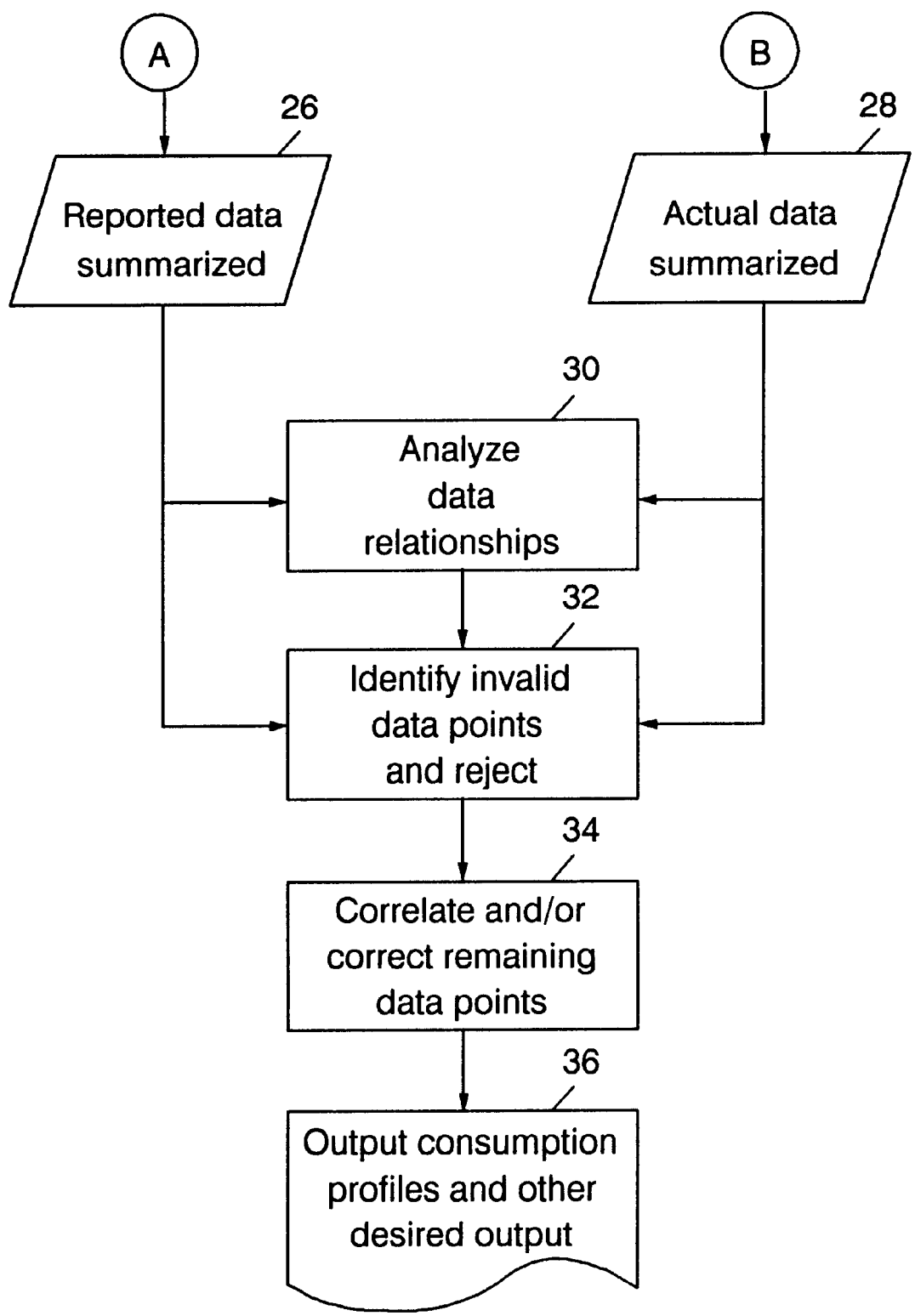
FIG. 2 is a continuation of the flow chart of FIG. 1.

Referring now to the drawings, FIGS. 1 and 2 show the process flow for one embodiment of a capacity consumption analysis method according to the present invention. In FIG. 1, resource consumption data is acquired from a software application, for example the the SAP Inc. R/3 enterprise resource planning solution, running on a target server. The reported data 10 acquired from the application does not provide a complete set of data. This data capture process should have minimal impact and invasiveness on the target monitored environment. This may conveniently be accomplished by connecting to the server through standard remote function calls using a personal computer connected to the network The data retrieved must be adjusted because, by definition, the data is sampled and is not actual or real-time. A single unit of work performed and reported by a software application program may, for example, report 1 second of CPU time consumed, but this does not capture the total consumption expended in accomplishing the total work element. This type of data can only come from actual consumption information as represented by block 12 in FIG. 1. However, a typical operating system does not have access to which activity is being supported by a given unit of CPU work. Because of the difficulty in correlating the consumption data to the activity being performed, the reported data elements do not directly map to the actual resource consumption.

After the data 10 is acquired, the observed activities are analyzed using a set of rules 14 which define the various selected profiles. If a profile is determined from these rules, "YES" in decision block 16 in FIG. 1, then the profile and activity are stored in step 18 for later reference and the data is then passed on to block 20. If a profile was not identified, the previous one is used and saved for this activity in block 22 and that information is then passed to step 20 as before. Preferably, the rules are defined within the software code, but a more generalized solution may be externalize these rules so that the present method would be readily adaptable for solving other profiling problems.

The reported data, activities and profiles are then summarized and time stamped in step 20 and the desired consumption by profile is created. Similarly, in step 24 the actual data is summarized and time stamped. The data is time stamped so that it can be compared to the actual data 12 coming from another data stream. When multiple servers are involved in providing data, these timestamps are used to gain a system wide view of activities and profiles that would otherwise be inaccurate if all system clocks and times were not synchronized. This summarized data, blocks 26 and 28 in FIG. 2, is then analyzed in step 30 to create an industry-wide view of consumption profiles for a particular software application. This analysis is focused on understanding the variability of the data and the relationship between reported and observed data. Once this step is completed, the standard deviation is determined and provided to the second processing block 32. In step 32 specific samples or time slices are evaluated for their conformance to the rest of the available data. An example of this is comparing the variability between reported CPU consumption and actual CPU consumption. Those time samples with wide variation from the rest of the data pairs represent an anomaly in either under-reporting consumption or the occurrence of an independent event that was observed by the operating system and not related to the monitored process. A least squares fit between reported and observed CPU consumption may conveniently be employed in order to define this variability. This approach has the advantage of identifying consistent non-observed workloads, which are manifested:as the y-intercept of the line derived from a least squares analysis.

The next step in FIG. 2 is the correlation and correction block 34. This step produces two actions. The first is taking the valid data points and reconciling the differences between observed and actual data by performing a corrective action between them and reporting out a single number. The second activity is the correlation of reported data elements with observed consumption. One means of accomplishing this is to correct database response times for queuing effects, then comparing them to CPU consumption on the database server, since some applications do not report database consumption by activity. It should be noted, that this case also passes through all the previously defined steps. This is necessary in order to filter out a "locking" situation that extends response time without actually increasing CPU utilization.

The analysis process of FIG. 2 is repeated once for each server monitored. The resulting individual consumption profiles are then be summarized into a set of consumption profiles for the entire software application being monitored. The results are then provided in any of a number of known forms in step 34, for example, in graphical or tabular formats.

There is thus provided a system and method which provided improved capacity consumption profiles which allow a software application solution user to more accurately size CPU capacity requirements for selected applications.

It will be understood by those skilled in the art that the present invention can be realized in hardware, software, or a combination of hardware and software. A capacity consumption profiling and analysis tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although the invention is described hereinabove with respect to preferred embodiments, it will be apparent to those skilled in the art that various modifications or alterations may be made which are intended to be included within the scope of the invention as set forth in the appended claims.

What is claimed is:

1. A method for monitoring the central processing unit resource capacity consumption in an information handling system having at least two computers in communication over a network, comprising the steps of:

creating a set of profiles to identify selected activities that use CPU resources;

receiving sampled activity CPU usage data from a software application program running on said CPU;

determining if said sampled activity data matches one of said set of profiles;

if no match is determined, assigning said activity data to the most recently identified profile;

receiving actual activity CPU usage data from an operating system regarding execution of said software application program;

determining the variability of said sampled activity data to said actual activity data;

correlating and correcting said received data; and assigning said CPU capacity consumption to each profile in said set of profiles according to said corrected received data.

2. The method of claim 1, wherein said step of determining the variability comprises the step of applying a least squares analysis of said sampled activity data and said actual activity data.

3. A method for monitoring a (CPU) central processing unit resource capacity consumption in an information handling system having at least two computers in communication over a network, comprising the steps of:

creating a set of profiles to identify selected activities that use CPU resources;

executing a software application program;

during execution, collecting both (a) a stream of sampled activity CPU usage data from the software application program running on said CPU, and (b) a stream of actual activity CPU usage data from an operating system regarding execution of said software application program;

assigning said stream of sampled activity CPU usage data to one of the profiles; and determining the variability of the stream of sampled activity CPU usage data with the stream of actual activity CPU usage data.

4. The method of claim 3, comprising the further step of time stamping both the stream of sampled activity CPU usage data and the stream of actual activity CPU usage data after they are generated so that step of determining the variability can be performed.

* * * * *